United States Patent
Ohba et al.

(10) Patent No.: US 8,944,508 B2
(45) Date of Patent: Feb. 3, 2015

(54) SEAT RECLINING DEVICE

(71) Applicant: Fuji Kiko Co., Ltd., Kosai-shi, Shizuoka (JP)

(72) Inventors: Tetsuya Ohba, Hamamatsu (JP); Tsunehito Ohba, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 67 days.

(21) Appl. No.: 13/663,048

(22) Filed: Oct. 29, 2012

(65) Prior Publication Data
US 2013/0106161 A1 May 2, 2013

(30) Foreign Application Priority Data
Oct. 31, 2011 (JP) .................. 2011-239135

(51) Int. Cl.
B60N 2/10 (2006.01)
B60N 2/225 (2006.01)
B60N 2/68 (2006.01)

(52) U.S. Cl.
CPC .............. B60N 2/2252 (2013.01); B60N 2/682 (2013.01); B60N 2/2254 (2013.01)
USPC ......................................................... 297/362

(58) Field of Classification Search
USPC ................... 297/362, 361.1, 354.12
See application file for complete search history.

(56) References Cited

U.S. PATENT DOCUMENTS

| | | | |
|---|---|---|---|
| 5,308,294 A | 5/1994 | Wittig et al. | |
| 6,305,748 B1 * | 10/2001 | Ohba | 297/362 |
| 6,692,397 B2 * | 2/2004 | Wang et al. | 475/162 |
| 7,243,994 B2 * | 7/2007 | Cha | 297/362 |
| 7,497,519 B2 * | 3/2009 | Dill et al. | 297/362 |
| 7,648,203 B2 * | 1/2010 | Voss et al. | 297/362 |
| 8,460,145 B2 * | 6/2013 | Mitsuhashi | 475/162 |
| 2007/0200408 A1 * | 8/2007 | Ohta et al. | 297/362.11 |
| 2008/0197686 A1 * | 8/2008 | Liebich et al. | 297/361.1 |
| 2012/0001471 A1 * | 1/2012 | Wei | 297/362 |
| 2012/0074752 A1 * | 3/2012 | Thiel | 297/362 |
| 2013/0334858 A1 * | 12/2013 | Chae et al. | 297/362 |

FOREIGN PATENT DOCUMENTS

| | | |
|---|---|---|
| JP | 06-040277 A | 2/1994 |
| JP | 2006-340872 A | 12/2006 |
| JP | 2009055985 A * | 3/2009 |

OTHER PUBLICATIONS

Matsumoto et al., Machine translation of JP 2009055985 A, date pulled Mar. 18, 2014, p. 1-10.*

* cited by examiner

Primary Examiner — Elizabeth A Plummer
(74) Attorney, Agent, or Firm — Foley & Lardner LLP

(57) ABSTRACT

In an eccentric-drive equipped seat reclining device including a cover having internal teeth, a base member, an external gear having fewer external teeth than a number of the internal teeth, a pair of wedge-shaped members and a guide plate located in an eccentric space between the cover and the external gear, a spring biasing the pair of wedge-shaped members apart from each other, and a driving member for circumferentially pushing the pair of wedge-shaped members, the external gear has a cylindrical protrusion. The base member has a first axially-recessed portion for press-fitting the external gear to the base member, a second axially-recessed portion accommodating the cylindrical protrusion, and a third axially-recessed portion accommodating the spring. Protrusions, formed integral with an annular outer peripheral portion of a backface of the second axially-recessed portion, are fitted to respective recessed portions of a seat-cushion side arm.

2 Claims, 4 Drawing Sheets

SEAT RECLINING DEVICE

TECHNICAL FIELD

The present invention relates to a seat reclining device for use in seats of automotive vehicles and the like, and specifically to a structure of an eccentric-drive mechanism (a planetary reduction gear mechanism) having a pair of wedge-shaped members and a guide plate, both installed in an annular eccentric space (an annular eccentric section).

BACKGROUND ART

As is well known, seat reclining devices are utilized in seats of automotive vehicles for adjusting an angular position of a seat back relative to a seat cushion. In recent years, there have been proposed and developed various seat reclining devices, in which a speed of an electric motor, serving as an actuator, is reduced at a high reduction ratio by a planetary reduction gear mechanism (an eccentric-drive speed reducer) for angular adjustment of a seat back relative to a seat cushion.

Such eccentric-drive equipped seat reclining devices have been disclosed in Japanese Patent Provisional Publication No. 06-40277 (hereinafter is referred to as "JP06-040277"), corresponding to U.S. Pat. No. 5,308,294, issued on May 3, 1994 and Japanese Patent Provisional Publication No. 2006-340872 (hereinafter is referred to as "JP2006-340872"). In the eccentric-drive equipped automobile seat hinge joint disclosed in JP06-040277, a first component (a first leaf) fixedly connected to a seat cushion and a second component (a second leaf) fixedly connected to a seat back are pivotally connected to each other via a relative-angle adjusting mechanism. The relative-angle adjusting mechanism is comprised of a spur gear, which is an integral part of the first leaf and can be obtained by stamping and has external teeth formed on the outer periphery, and a substantially annular internal gear, which is an integral part of the second leaf and can be obtained by stamping and has internal teeth. The spur gear has one fewer external teeth than the number of internal teeth on the annular internal gear, and the external teeth of the spur gear mates in a certain way with the internal teeth of the internal gear, so as to permit the spur gear and the internal gear to roll along each other. Also, a pair of wedge-shaped members and a centering element are accommodated in an annular eccentric space defined between the inner peripheral surface of the first leaf and the outer peripheral surface of a bush (an outer sleeve), which bush is press-fitted to the second leaf and surrounds a tubular actuating inner sleeve (serving as a driving member of the relative-angle adjusting mechanism) such that the actuating inner sleeve is rotatable relative to the second leaf. Also provided is a circular-arc spring (a torsion spring) whose first leg bears against the radially-wider end portion of one of the two wedge-shaped members and whose second leg bears against the radially-wider end portion of the other wedge-shaped member, such that the radially-narrower two opposing end portions of the wedge-shaped members are forced toward each other.

In the seat reclining device disclosed in JP2006-340872, an external gear and a base plate of the seat cushion side are press-fitted to each other. On the other hand, the outer peripheries of an internal gear and the base plate are retained or held by means of a holder ring, while superposing the internal gear on the base plate. The outside face of the base plate, produced by stamping, is formed with embossed portions, which protrude in one axial direction of a pivot axis of a seat-cushion side mounting arm and a seat-back side mounting arm and by which the base plate is fixedly connected to the seat-cushion side mounting arm. The outside face of the internal gear, produced by stamping, is also formed with embossed portions, which protrude in the opposite axial direction of the pivot axis and by which the internal gear is fixedly connected to the seat-back side mounting arm. In the case of the seat reclining device of JP2006-340872, only a pair of wedge-shaped members is installed in an annular eccentric space without a centering element (a guide plate). Also provide is a metal bearing press-fitted to the inner peripheral surface of the external gear.

SUMMARY OF THE INVENTION

In the case of the seat reclining device of JP06-040277, the wedge-shaped member pair and the centering element are both installed in the annular eccentric space so that the wedge-shaped member pair is axially superposed on the centering element. The entire axial thickness of the seat reclining device of JP06-040277 tends to be greater than that of the seat reclining device of JP2006-340872 employing only the wedge-shaped member pair in the annular eccentric space. For instance, assume that the structure of the seat reclining device of JP2006-340872 having the metal bearing press-fitted to the inner peripheral surface of the external gear is simply combined with the structure of the seat reclining device of JP06-040277 having both the wedge-shaped member pair and the centering element in the annular eccentric space. In such a case, in order to lower a contact pressure between the sliding-contact surfaces of the inner periphery of the metal bearing and the outer periphery of the centering element (the guide plate), the combined structure requires a further increase in the axial dimension of the centering element. This leads to a further increase in the entire axial thickness of the seat reclining device. Thus, it would be desirable to reduce or suppress an increase in axial thickness of the seat reclining device as much as possible, while lowering a contact pressure between the sliding-contact surfaces of the metal bearing and the centering element (the guide plate).

Accordingly, it is an object of the invention to provide a seat reclining device configured to suppress an increase in the entire axial thickness of the seat reclining device as much as possible, while axially superposing a pair of wedge-shaped members on a guide plate (a centering element).

In order to accomplish the aforementioned and other objects of the present invention, a seat reclining device comprises a cover adapted to be fixedly connected to one of a seat-cushion side arm attached to a seat cushion and a seat-back side arm attached to a seat back, and having internal teeth, a base member adapted to be fixedly connected to the other of the seat-cushion side arm and the seat-back side arm, and configured to be rotatable relatively to the cover, an external gear configured to have fewer external teeth than the number of the internal teeth of the cover, one axial part of the external gear being press-fitted to an inner periphery of a recessed structure of the base member, and the other axial part of the external gear partly meshing with the internal teeth, a joining ring provided for joining the base member and the cover together by retaining outer peripheries of the base member and the cover, while permitting relative rotation between the base member and the cover but restricting axial movement of both of them, a pair of wedge-shaped members located in an annular eccentric space defined between an outer peripheral surface of a cylindrical portion of the cover and an inner peripheral surface of the external gear with the external teeth of the external gear brought into meshed-engagement with the internal teeth, wider basal ends of the wedge-shaped members being arranged to be circumferentially opposed to each other, a guide plate located in the eccentric space, and axially juxtaposed to the pair of wedge-shaped members, and kept in sliding-contact with both the outer peripheral surface of the cylindrical portion of the cover and the inner peripheral surface of the external gear, a substantially ring-shaped spring provided for circumferentially biasing the wider basal ends of the wedge-shaped members apart from each other, and a driving member configured to have a substantially cylindrical-hollow portion rotatably fitted into the cylindrical portion of the cover, a flanged portion formed integral with the cylindrical-hollow portion, and a pushing lug formed integral with the flanged portion so as to axially protrude toward the eccentric space and configured to circumferentially push either one of narrower ends of the wedged-shaped members, wherein an inside-perimeter portion of the external gear in close vicinity to the inner peripheral surface of the external gear is formed as a cylindrical protrusion configured to axially protrude toward the base member, wherein the base member has a first annular axially-recessed portion whose inner periphery is configured as an internal-toothed portion for press-fitting the one axial part of the external gear to the base member, a second annular axially-recessed portion formed on an inside perimeter of the first annular axially-recessed portion for accommodating therein the cylindrical protrusion of the external gear, and a third annular axially-recessed portion formed on an inside perimeter of the second annular axially-recessed portion for accommodating therein the spring, and wherein the base member has an annular outer peripheral portion formed on a backface of the second annular axially-recessed portion and an annular outer peripheral portion formed on a backface of the third annular axially-recessed portion, and the other of the seat-cushion side arm and the seat-hack side arm has at least one fitting recessed portion, and either one of the annular outer peripheral portion of the backface of the second annular axially-recessed portion and the annular outer peripheral portion of the backface of the third annular axially-recessed portion is fitted to the fitting recessed portion for integral connection.

The other objects and features of this invention will become understood from the following description with reference to the accompanying drawings.

DESCRIPTION OF THE PREFERRED EMBODIMENTS

Figure 1:
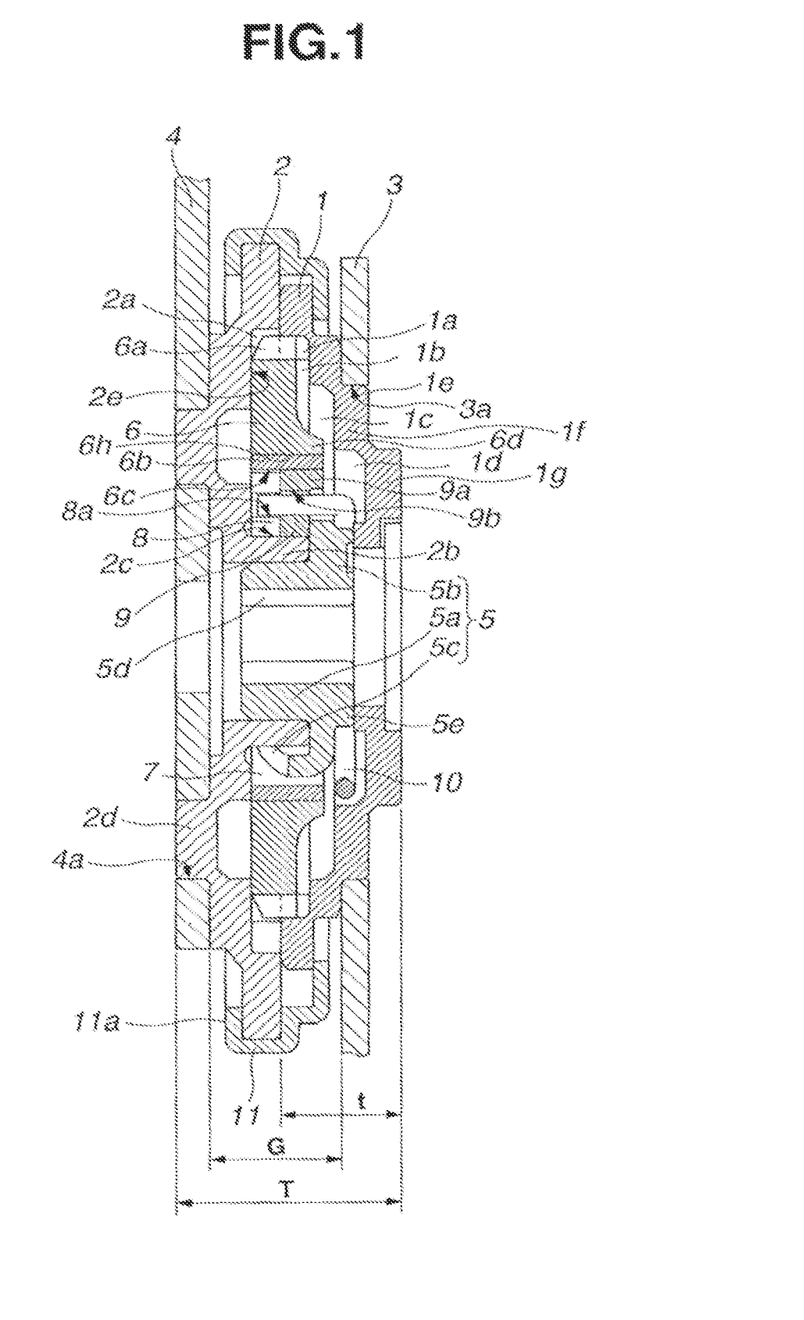
FIG. 1 is a cross-sectional view illustrating an embodiment of an eccentric-drive equipped seat reclining device.
Figure 2:
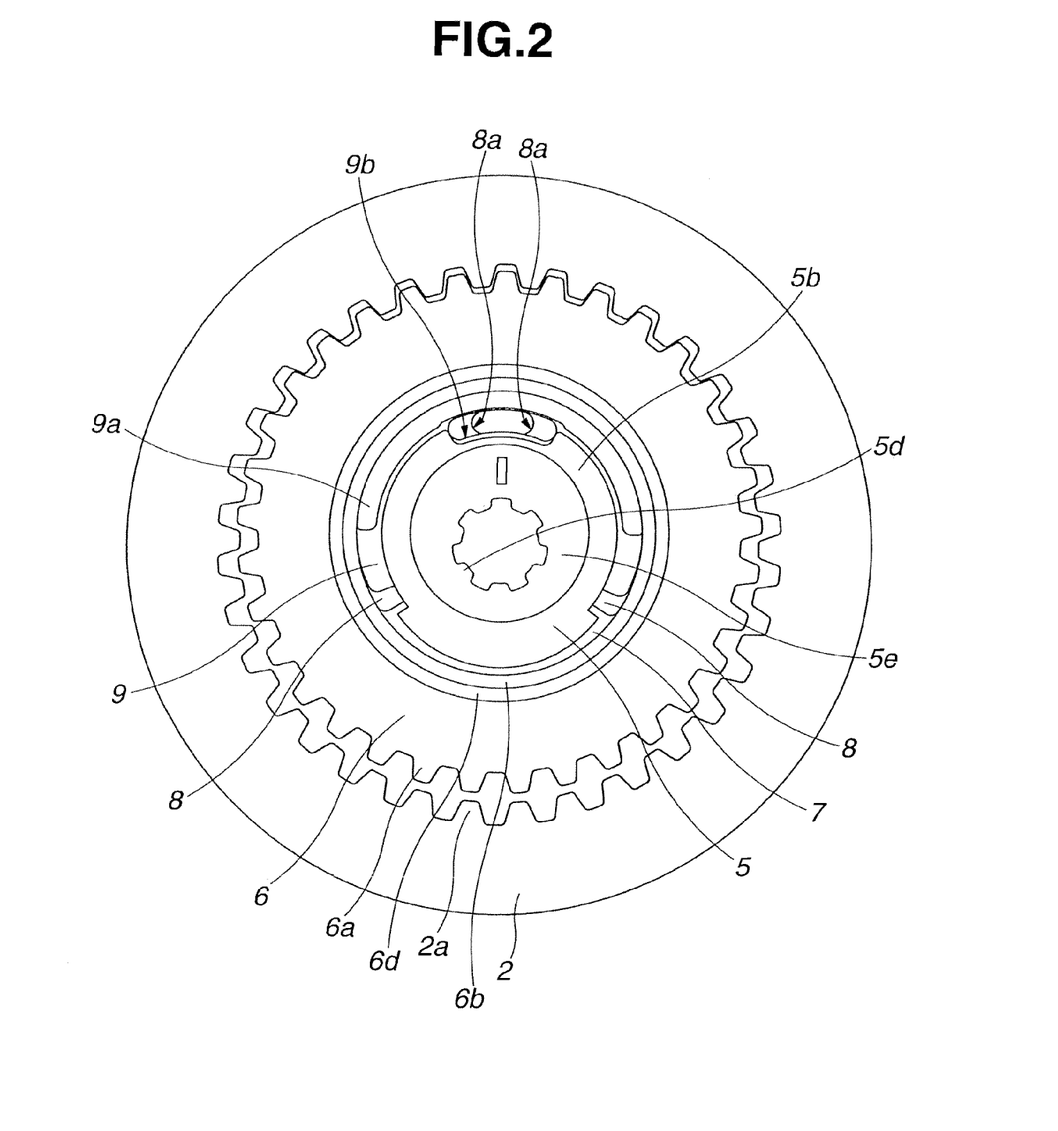
FIG. 2 is an assembled view of the eccentric-drive mechanism of the seat reclining device of the embodiment under a specific state where a base member and a ring-shaped torsion spring are removed.
Figure 3:
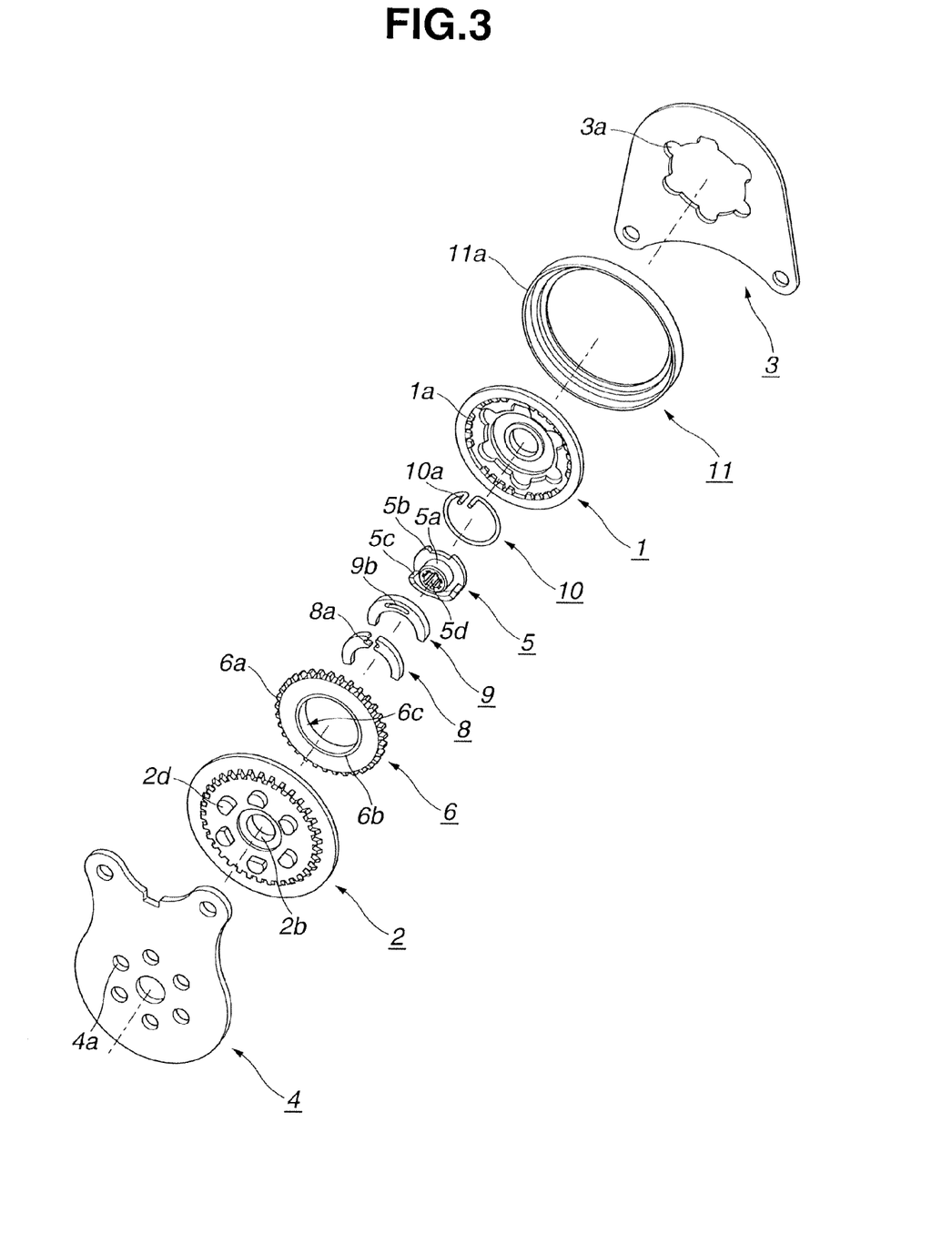
FIG. 3 is a dis-assembled perspective view illustrating the seat reclining device of the embodiment.

Referring now to the drawings, particularly to FIGS. 1-3, the seat reclining device of the embodiment is comprised of a base member 1 adapted to be fixedly connected to a seat-cushion side arm 3 attached to a seat cushion, a cover (a side plate) 2 adapted to be fixedly connected to a seat-back side arm 4 attached to a seat back, and a driving bush 5 (serving as a driving member), which bush is driven by means of an electric motor (not shown). As described later, the eccentric-drive mechanism (simply, the eccentric drive) is configured so that, when applying rotary motion in either one of two opposite rotation directions to the driving bush 5, the cover 2 rotates relatively to the base member 1 in the direction opposite to the rotation direction of the driving bush 5, while being speed-reduced at a high reduction ratio.

As shown in FIG. 1, cover 2 is formed with a substantially cylindrical recessed portion 2e. Cover 2 has internal teeth 2a formed on the inner peripheral surface of the recessed portion 2e. On the other hand, as best seen in FIG. 3, base member 1 has internal teeth 1a formed intermittently on the inner peripheral surface thereof. One axial part (the right-hand side axial section, viewing FIG. 1) of external teeth 6a (i.e., an external toothed portion) formed on the outer peripheral surface of an external gear 6 shown in FIG. 1 is press-fitted to the intermittent internal toothed portion 1a of base member 1. By press-fitting of the right-hand side axial section of the external toothed portion 6a to the internal toothed portion 1a, the external gear 6 is integrally connected to the base member 1. As can be appreciated from FIGS. 1-2, the other (remaining) axial part (the left-hand side axial section, viewing FIG. 1) of the external toothed portion 6a of external gear 6 mates or meshes in a certain way with the internal toothed portion 2a of cover 2, so as to permit the external toothed portion 6a of external gear 6 and the internal toothed portion 2a of cover 2 to roll along each other. As seen in FIG. 2, regarding meshing-engagement between the internal toothed portion 2a of cover 2 and the external toothed portion 6a of external gear 6, the external gear 6 is configured or designed to have one fewer external teeth 6a than the number of internal teeth 2a of cover 2, and hence the geometric center of the external toothed portion 6a of external gear 6 is laid out at a position slightly displaced from the geometric center of the internal toothed portion 2a of cover 2. In the shown embodiment, as clearly shown in FIG. 2, the geometric center of the external toothed portion 6a deviates vertically upward from the geometric center of the internal toothed portion 2a, and hence only one tooth of external teeth 6a of external gear 6 is permitted to be deeply-engaged with the internal teeth 2a of cover 2 at its 12 o'clock position in line with the eccentric direction of the geometric center of the external toothed portion 6a eccentric to the geometric center of the internal toothed portion 2a.

Returning to FIG. 1, cover 2 is formed integral with a cylindrical portion 2b whose geometric center is concentric to the geometric center of the internal toothed portion 2a. On the other hand, external gear 6 has a central cylindrical bore 6h whose inner peripheral surface has a geometric center concentric to the geometric center of the external toothed portion 6a of external gear 6. A ring-shaped metal bearing 6b is press-fitted to the inner peripheral surface of the central cylindrical bore 6h of external gear 6. The inner peripheral surface 6c of metal bearing 6b is formed of a low-friction material, such as polytetrafluoroethylene-coated (PTFE-coated) copper. An annular eccentric space 7 is defined between the outer peripheral surface 2c of the cylindrical portion 2b of cover 2 and the inner peripheral surface 6c of metal bearing 6b.

As shown in FIG. 2, a pair of wedge-shaped members 8, 8 are located or installed in the eccentric space 7 such that the roots (wider basal ends) of the wedge-shaped member pair 8, 8 are circumferentially opposed to each other. Each of the wedge-shaped members 8, 8 is formed into a substantially arcuate shape whose radial width gradually narrows or decreases from the basal end toward the tip. The wider basal ends of the wedge-shaped member pair 8, 8 are formed with respective recessed spring-hanger portions 8a, 8a. The space defined between the wider basal ends of the wedge-shaped member pair 8, 8 receives a ring-shaped spring 10 shown in FIG. 3 and having a first leg (a first short hook) 10a bearing against the recessed spring-hanger portion of one of the wider basal ends of the wedge-shaped member pair 8, 8 and a second leg (a second short hook) 10a bearing against the recessed spring-hanger portion of the other of the wider basal ends. This ensures that the wider basal ends of the wedge-shaped member pair 8, 8 are permanently biased apart from each other in the circumferential direction, and that the narrower ends of the wedge-shaped member pair 8, 8 are permanently biased toward each other. By virtue of the wider basal ends of the wedge-shaped member pair 8, 8 circumferentially biased apart from each other by the spring force of the ring-shaped spring 10, the deeply-engaged tooth of the external teeth 6a is kept in a backlash-free relationship with the internal teeth 2a of cover 2. In more detail, by the wedge effect of the spring-loaded wedge-shaped member pair 8, 8, as well as the spring force of the ring-shaped spring 10, the center distance (i.e., the eccentricity) between the geometric center of the external toothed portion 6a of external gear 6 and the geometric center of the internal toothed portion 2a of cover 2 can be enlarged. That is, the external gear 6 is pushed upward (see FIG. 2), in other words, in the eccentric direction of the geometric center of the external toothed portion 6a eccentric to the geometric center of the internal toothed portion 2a. Hence, only one tooth of external teeth 6a of external gear 6 is permitted to be deeply-engaged with the internal teeth 2a of cover 2 in the eccentric direction, thereby ensuring a backlash-free state at the deep engagement point of external teeth 6a and internal teeth 2a. This eliminates a radial play between the external gear 6 having the metal bearing 6b and the wedge-shaped member pair 8, 8, in sliding-contact with each other, in the annular space defined between the cylindrical portion 2b and the inner toothed portion 2a of cover 2.

Figure 5:
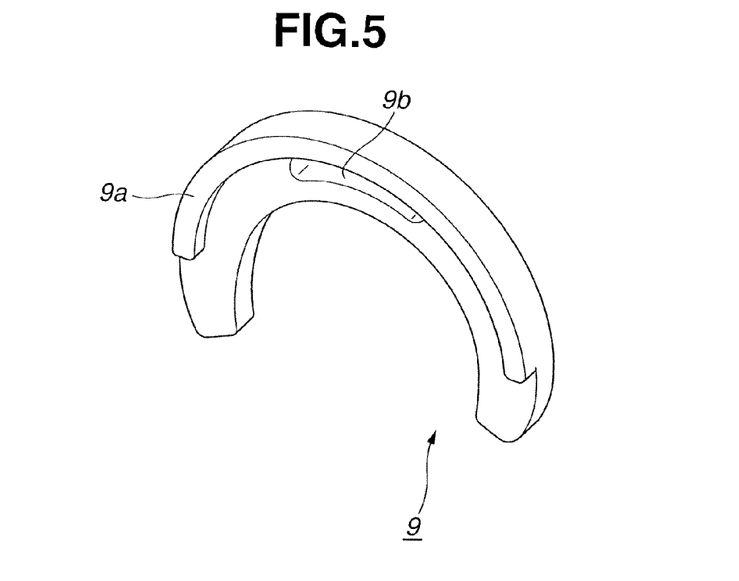
FIG. 5 is a perspective view illustrating a guide plate of the seat reclining device of the embodiment.

The wedge-shaped member pair 8, 8 is flanked on the right-hand side face (viewing FIG. 1) with a guide plate 9, such that the guide plate 9 is axially superposed on the wedge-shaped member pair 8, 8, that is, the wedge-shaped member pair 8, 8 and the guide plate 9 are axially juxtaposed to each other. The wedge-shaped members 8, 8 are arranged on the side of cover 2 and installed within the eccentric space 7, whereas the guide plate 9 is arranged on the side of base member 1 and installed within the eccentric space 7. Guide plate 9 is formed into a substantially circular-arc or crescent shape. Concretely, the inner peripheral surface of guide plate 9 is configured to be substantially conformable to the circular-arc shape having almost the same radius as the outer peripheral surface 2c of the cylindrical portion 2b of cover 2. Also, the outer peripheral surface of guide plate 9 is configured to be substantially conformable to the circular-arc shape having the almost the same radius as the inner peripheral surface 6c of metal bearing 6b of external gear 6. As describer later, during angular adjustment of the seat back relative to the seat cushion, the eccentric space 7 can be displaced in the circumferential direction under a state where the center distance (i.e., the eccentricity) between the geometric center of the external toothed portion 6a of external gear 6 and the geometric center of the internal toothed portion 2a of cover 2 is held constant by virtue of the previously-discussed wedge effect of the spring-loaded wedge-shaped member pair 8, 8, as well as the spring force of the ring-shaped spring 10. As best seen in FIG. 5, guide plate 9 is formed with a circumferentially-elongated cocoon-shaped slotted hole 9b through which first and second short hooks 10a, 10a of the ring-shaped spring 10 are engaged with the respective recessed spring-hanger portions of the wedge-shaped members 8, 8.

In order to push and rotate the wedge-shaped member pair 8, 8 in the circumferential direction, the driving bush 5 is installed. Driving bush 5 has a substantially cylindrical-hollow portion 5a, a flanged portion 5b, and a circular-arc shaped pushing lug 5c. As best seen in FIG. 1, the cylindrical-hollow portion 5a is rotatably inserted and fitted into the cylindrical portion 2b of cover 2. The flanged portion 5b is formed integral with the cylindrical-hollow portion 5a for restricting one axial movement (the rightward axial movement, viewing FIG. 1) of each of the wedge-shaped member pair 8, 8 and the guide plate 9, thereby preventing these axially-superposed component parts 8, 8 and 9 from falling off. The circular-arc shaped pushing lug 5c is formed integral with the flanged portion 5b so as to axially protrude toward the eccentric space 7. The two circumferential ends of the circular-arc shaped pushing lug 5c of the driving bush 5 are configured to be abutted-engaged with the respective narrower ends of the wedge-shaped member pair 8, 8 in the circumferential direction. For instance, when the driving bush 5 rotates clockwise (viewing FIG. 2), the left-hand circumferential end of the circular-arc shaped pushing lug 5c acts to push the narrower end of the left-hand wedged-shaped member 8 in the same circumferential direction (i.e., in the clockwise direction). Conversely when the driving bush 5 rotates anticlockwise (viewing FIG. 2), the right-hand circumferential end of the circular-arc shaped pushing lug 5c acts to push the narrower end of the right-hand wedged-shaped member 8 in the same circumferential direction (i.e., in the anticlockwise direction). For the purpose of torque-transmission from an input shaft (not shown) to the driving bush 5, the cylindrical-hollow portion 5a has internal splined portion (internal splines) 5d formed therein. The internal splined portion 5d of the cylindrical-hollow portion 5a is spline-connected to the external-splined portion of the input shaft.

As shown in FIGS. 1 and 3, the respective component parts, namely, the cover 2, the external gear 6, the wedge-shaped member pair 8, 8, the guide plate 9, the driving bush 5, the ring-shaped spring 10, and the base plate 1, are assembled to each other in a manner so as to be axially superposed each other. A joining ring (a holder ring) 11 is also provided for joining the base member 1 and the cover 2 together by clamping, retaining or holding the outer peripheries of the two component parts 1 and 2, while permitting relative rotation between the base member 1 and the cover 2 but appropriately restricting axial movement as well as radial movement of both of them. Before assembling, as shown in FIG. 3, the outer peripheral portion 11a of joining ring 11 is configured as an axially-extending cylindrical-hollow portion having a short axial length. After having assembled, as shown in FIG. 1, the axially-extending cylindrical-hollow portion 11a of joining ring 11 is hemmed and bent radially inward along the perimeter of the rim of cover 2.

Previously discussed is the fundamental construction of the seat reclining device of the embodiment. The essential part of the seat reclining device of the embodiment is hereunder described in detail.

As shown in FIG. 1, an inside-perimeter section of external gear 6 in close vicinity to the inner peripheral surface of the central cylindrical bore 6h of external gear 6 is formed as a cylindrical protrusion 6d configured to axially protrude toward the base member 1. The axial length of metal bearing 6b is dimensioned as a large axial length configured to be substantially conformable to that of the cylindrical protrusion 6d. The reason for this is that the sliding-contact area of the inner peripheral surface of metal bearing 6b with the outer peripheral surface of guide plate 9 can be increased owing to the large axial length of metal bearing 6b, thus lowering the contact pressure between the sliding-contact surfaces when the metal bearing 6b is sliding on the outer peripheral surface of guide plate 9.

In order to match the axial length of the outer peripheral surface of guide plate 9 with the axial length of metal bearing 6b, as best seen in FIG. 5, the guide plate 9 has a circumferentially-curved circular-arc shaped outer peripheral protrusion 9a integrally formed with the circumference of guide plate 9. The outer peripheral protrusion 9a is configured to axially protrude toward the base member 1, and also configured to flush with the axial end face (the right-hand annular sidewall, viewing FIG. 1) of the cylindrical protrusion 6d of external gear 6, facing the base member 1. As a result of the formation of the outer peripheral protrusion 9a, the guide plate 9 has a recessed, circular-arc shaped internal space defined on the inside perimeter of the outer peripheral protrusion 9a of guide plate 9. The flanged portion 5b of the driving bush 5 is accommodated in the recessed, circular-arc shaped internal space of the outer peripheral protrusion 9a of guide plate 9.

The previously-discussed ring-shaped spring 10 is interleaved between the flanged portion 5b of the driving bush 5b and the inside face (the left-hand sidewall, viewing FIG. 1) of the base member 1. As best seen in FIGS. 1-2, the driving bush 5 has a substantially ring-shaped protrusion 5e, arranged within the loop drawn by the ring-shaped spring 10 and configured to protrude axially rightward (viewing FIG. 1) from the flanged portion 5b of the driving bush 5. The ring-shaped protrusion 5e of the driving bush 5 is kept in sliding-contact with the inside face of the base member 1. The flanged portion 5b of the driving bush 5 is positioned between the inside face of the base member 1 and the axial end face (the right-hand annular sidewall, viewing FIG. 1) of the cylindrical portion 2b of cover 2. On the other hand, the wedge-shaped member pair 8, 8, the guide plate 9, and the flanged portion 5b of the driving bush 5 are positioned between the inside face of base member 1 and the bottom face of the recessed portion 2e of cover 2, in that order, in the axial direction.

As clearly shown in FIG. 1, the base member 1 has a substantially concentric three-stepped recessed structure constructed by (i) a first annular axially-recessed portion 1b whose inner periphery is formed as the intermittent internal toothed portion 1a for press-fitting the one axial part of the external toothed portion 6a of external gear 6 to the base member 1, (ii) a second annular axially-recessed portion 1c formed on the center side (the inside perimeter) of the first annular axially-recessed portion 1b for accommodating therein the cylindrical protrusion 6d of external gear 6, and (iii) a third annular axially-recessed portion 1d formed on the center side (the inside perimeter) of the second annular axially-recessed portion 1c for accommodating therein the ring-shaped spring 10.

Figure 4:
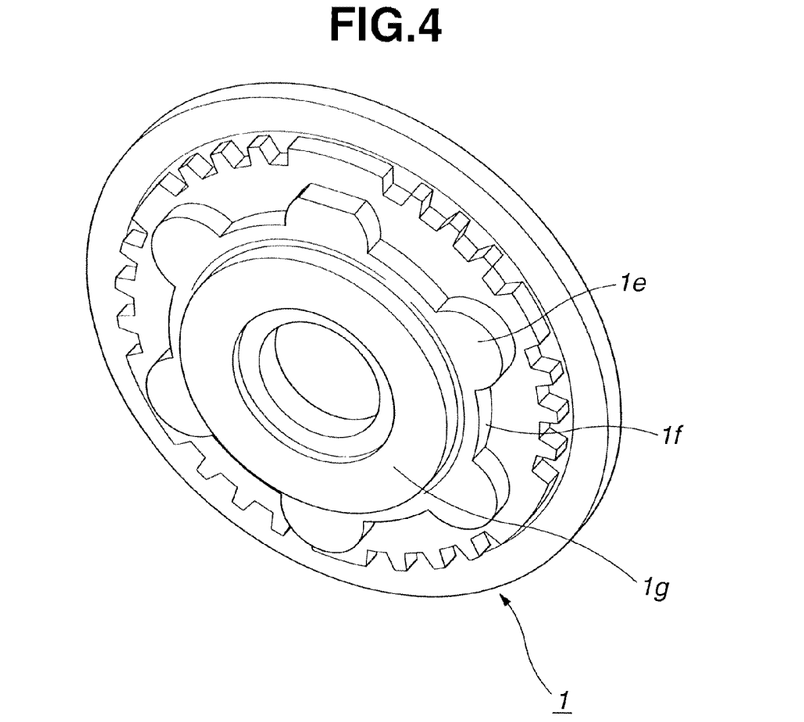
FIG. 4 is a perspective view illustrating the base member of the seat reclining device of the embodiment.

The base member 1 is formed or produced by half blanking. Hence, as seen in FIG. 4, the base member 1 has (iv) a second annular outer peripheral portion 1f formed on the side of the backface of base member 1, corresponding to the second annular axially-recessed portion 1c of the inside face of base member 1, and (v) a third annular outer peripheral portion 1g formed on the side of the backface of the base member 1, corresponding to the third annular axially-recessed portion 1d of the inside face of base member 1. Also, in the shown embodiment, the second annular outer peripheral portion 1f is formed with six circumferentially-equidistant spaced, fitting protrusions 1e configured to protrude radially outward from the circumference of the second annular outer peripheral portion 1f. As clearly shown in FIG. 3, the six fitting protrusions 1e of the second annular outer peripheral portion 1f are fitted to respective fitting recessed portions 3a formed in the seat-cushion side arm 3 and then welded together.

On the other hand, as clearly shown in FIG. 3, the cover 2 is formed on its outside face with substantially cylindrical, six axially-extending fitting protrusions 2d for integral connection of the seat-back side arm 4 and the cover 2. More concretely, the six fitting protrusions 2d of the cover 2 are fitted to respective fitting recessed portions 4a formed in the seat-back side arm 4, and then welded together.

By the way, in the shown embodiment, as previously discussed, the second annular outer peripheral portion 1f of the base member 1 is formed with the six fitting protrusions 1e fitted to the respective fitting recessed portions 3a of the seat-cushion side arm 3. In lieu thereof, the third annular outer peripheral portion 1g may be formed with six circumferentially-equidistant spaced, fitting protrusions configured to protrude radially outward from the circumference of the third annular outer peripheral portion 1g, and the six fitting protrusions of the third annular outer peripheral portion 1g may be fitted to the respective fitting recessed portions 3a of the seat-cushion side arm 3 and then welded together.

The operation and effects of the seat reclining device of the embodiment are hereinafter described in detail.

First, the basic operation of the seat reclining device of the embodiment is explained. When the driving bush 5 is rotated in either one of two opposite rotation directions by means of the input shaft (not shown), the circular-arc shaped pushing lug 5c acts to push the narrower end of one of the two wedge-shaped members 8, 8 in the same rotation direction. At this time, the ring-shaped spring 10 becomes slightly compressed. The other of the two wedge-shaped members 8, 8 moves slightly in the same rotation direction by the slightly-compressed distance of the spring 10, and thus the wedge-shaped member pair 8, 8 begins to move out of jammed-engagement (bitten-engagement). This permits sliding motion of the guide plate 9 between the outer peripheral surface 2c of the cylindrical portion 2b of cover 2 and the inner peripheral surface 6c of metal bearing 6b of external gear 6. Hence, the wedge-shaped member pair 8, 8 and the guide plate 9 rotate in the same circumferential direction within the eccentric space 7, while holding or keeping the eccentricity between the outer peripheral surface 2c of the cylindrical portion 2b of cover 2 and the inner peripheral surface 6c of metal bearing 6b of external gear 6, in other words, the center distance between the geometric center of the external toothed portion 6a of external gear 6 and the geometric center of the internal toothed portion 2a of cover 2 constant. As a result of this, the deep engagement point of external teeth 6a and internal teeth 2a also moves in the same circumferential direction. When the deep engagement point has made one complete revolution and is back at its 12 o'clock position, owing to the external gear 6 having one fewer external teeth 6a than the number of internal teeth 2a of cover 2, the cover 2 having the internal teeth 2a rotates relatively to the base member 1 by one tooth in the direction opposite to the rotation direction of the deep engagement point. That is to say, when the driving bush 5 rotates, the cover 2, together with the seat-back side arm 4, rotates relatively to the base member 1, fixedly connected to the seat-cushion side arm 3, in the direction opposite to the rotation direction of the driving bush 5, while being speed-reduced at a high reduction ratio. As a result of this, the seat back can rotate relatively to the seat cushion. Thereafter, immediately when the rotary motion of the driving bush 5 has been stopped, the wedge-shaped member pair 8, 8 is brought into jammed-engagement (bitten-engagement) between the outer peripheral surface 2c of the cylindrical portion 2b of cover 2 and the inner peripheral surface 6c of metal bearing 6b of external gear 6 by the spring force of the spring 10, and thus locked stationary.

In this manner, under the locked state of the wedge-shaped member pair, the wedge-shaped member pair 8, 8 has been jammed or bitten or locked between the outer peripheral surface 2c of the cylindrical portion 2b of cover 2 and the inner peripheral surface 6c of metal bearing 6b of external gear 6. The wedge-shaped member pair, put into jammed-engagement (bitten-engagement), contributes to a reduced play (or an eliminated play) at the tooth engagement area of external teeth 6a and internal teeth 2a. In contrast, under the unlocked state of the wedge-shaped member pair, in other words, with the wedge-shaped member pair, held out of jammed-engagement (bitten-engagement) between the outer peripheral surface 2c of the cylindrical portion 2b of cover 2 and the inner peripheral surface 6c of metal bearing 6b of external gear 6, the guide plate 9 ensures a smooth sliding motion of the cylindrical portion 2b of cover 2 on the inner peripheral surface of guide plate 9 and simultaneously ensures a smooth sliding motion of the metal bearing 6b on the outer peripheral surface of guide plate 9. As discussed above, a function for play-elimination and a function for smooth sliding-motion are individually allotted to the wedge-shaped member pair 8, 8 and the guide plate 9. This contributes to smooth rotary motion of the seat back relative to the seat cushion, that is, smooth angular adjustment of the seat back relative to the seat cushion.

According to the eccentric-drive equipped seat reclining device of the embodiment, the base member 1 has a three-stepped recessed structure constructed by the first annular axially-recessed portion 1b, the second annular axially-recessed portion 1c, and the third annular axially-recessed portion 1d, all formed in the inside face of the base member 1, in that order, in the axial direction. The second annular axially-recessed portion 1c is configured to accommodate therein the cylindrical protrusion 6d of external gear 6, whereas the third annular axially-recessed portion 1d is configured to accommodate therein the spring 10. Even when the inner peripheral portion of external gear 6 and the eccentric space 7 both thicken by installing the guide plate 9 as well as the wedge-shaped member pair 8, 8 in the eccentric space 7, it is possible to keep the axial length "t" of the base member 1 within almost the same dimension as the entire axial length of an ordinary base member (involving an emboss length) integrally formed with a plurality of embossed fitting-protrusions for integral connection of a seat-cushion side arm and the base member. Hence, it is possible to keep the total axial dimension "T" of the seat reclining device of the embodiment within almost the same dimension as an ordinary seat reclining device. Furthermore, according to the eccentric-drive equipped seat reclining device of the embodiment, the base member 1 and the seat-cushion side arm 3 are integrally connected to each other by fitting the second annular outer peripheral portion 1f formed on the backface of the base member 1 to the seat-cushion side arm 3. Hence, the mounting width "G" (the axial distance) between the two opposing inside faces of the seat-cushion side arm 3 fitted to the second annular outer peripheral portion 1f and the seat-back side arm 4 fitted to the cover 2 can be dimensioned to be less than that of an ordinary seat reclining device.

As set forth above, in the seat reclining device of the embodiment, even in the case of adoption of construction (seat-reclining-device design) such that the inner peripheral portion of external gear 6 and the eccentric space 7 both thicken by installing the guide plate 9 as well as the wedge-shaped member pair 8, 8 in the eccentric space 7, the axial length "t" of the base member 1 can be kept within almost the same dimension as the entire axial length of an ordinary base member (involving an emboss length), thereby keeping the total axial dimension "T" of the seat reclining device of the embodiment within almost the same dimension as an ordinary seat reclining device.

According to the seat reclining device of the embodiment, the guide plate 9 is arranged on the side of base member 1, and has the outer peripheral protrusion 9a formed integral with the circumference of guide plate 9, such that the flanged portion 5b of the driving bush 5 is compactly accommodated in the recessed internal space defined on the inner peripheral side of guide plate 9 as a result of the formation of the outer peripheral protrusion 9a. Therefore, it is possible to reduce the size (in particular, the outside diameter) of the driving-bush flanged portion 5b provided for preventing the wedge-shaped member pair 8, 8 and the guide plate 9 from falling out from the eccentric space 7. By a synergism of the formation of the appropriately axially-extending outer peripheral protrusion 9a and the driving-bush flanged portion 5b compactly accommodated in the recessed internal space defined on the inner peripheral side of guide plate 9 as a result of the formation of the outer peripheral protrusion 9a, it is possible to suppress the flanged portion 5b from protruding into the third annular axially-recessed portion 1d, while ensuring an appropriate sliding-contact area of the inner peripheral surface of metal bearing 6b of external gear 6 with the outer peripheral surface of guide plate 9. Also, by virtue of the downsized driving-bush flanged portion 5b having the appropriately reduced outside diameter, it is possible to appropriately reduce the outside diameter of the ring section of the spring 10, thereby enabling the spring 10 to be compactly installed within the third annular axially-recessed portion 1d.

Additionally, according to the seat reclining device of the embodiment, it is possible to ensure an appropriate sliding-contact area of the inner peripheral surface of metal bearing 6b of external gear 6 with the outer peripheral surface of guide plate 9, thereby permitting contact pressure between the sliding-contact surfaces of the inner peripheral surface of metal bearing 6b of external gear 6 and the outer peripheral surface of guide plate 9 to be kept within a pressure level less than or equal to a predetermined pressure value. This ensures a smooth sliding motion of guide plate 9.

Also, by virtue of the downsized spring 10 having the appropriately reduced ring diameter as well as the downsized driving-bush flanged portion 5b having the appropriately reduced outside diameter, the spring 10 can be compactly installed within the third annular axially-recessed portion 1d, thus enabling the total axial dimension "T" of the seat reclining device of the embodiment to be kept within almost the same dimension as an ordinary seat reclining device.

Furthermore, according to the seat reclining device of the embodiment, the fitting portion of the side of base member 1 for integral connection of the seat-cushion side arm 3 with the base member 1 is configured as the second annular outer peripheral portion 1f formed on the backface of the base member 1. Hence, the mounting width "G" (the axial distance) between the two opposing inside faces of the seat-cushion side arm 3 fitted to the second annular outer peripheral portion 1f and the seat-back side arm 4 fitted to the cover 2 can be dimensioned to be less than that of an ordinary seat reclining device. Additionally, it is possible to adequately reduce the outside diameter of the third annular axially-recessed portion 1d, which is configured to accommodate therein the spring 10, thereby ensuring a satisfactory size of each of circumferentially-equidistant spaced, fitting protrusions 1e configured to protrude radially outward from the circumference of the second annular outer peripheral portion 1*f*. This contributes to the increased or enhanced mechanical strength for integral connection of the seat-cushion side arm 3 with the base member 1.

As discussed previously, according to the seat reclining device of the embodiment, the mounting width "G" (the axial distance) between the two opposing inside faces of the seat-cushion side arm 3 and the seat-back side arm 4 is dimensioned to be less than that of an ordinary seat reclining device. By virtue of the comparatively narrow mounting width "G", the seat reclining device of the embodiment has the sufficient mechanical strength for various stresses produced or developed in the structural members of the seat reclining device due to inclination of either the seat-cushion side arm 3 or the seat-back side arm 4.

As previously discussed, by virtue of the downsized spring 10 having the appropriately reduced ring diameter, it is possible to adequately reduce the outside diameter of the third annular axially-recessed portion 1*d* accommodating therein the spring 10, thereby enabling the radial dimension between the first annular axially-recessed portion 1*b* and the third annular axially-recessed portion 1*d* to be appropriately enlarged. This contributes to the increased or enhanced mechanical strength for integral connection of the seat-cushion side arm 3 with the base member 1.

By the way, in the shown embodiment, base member 1 is fixedly connected to the seat-cushion side arm 3, whereas cover (the side plate) 2 is fixedly connected to the seat-back side arm 4. In lieu thereof, base member 1 may be fixedly connected to the seat-back side arm 4, whereas cover (the side plate) 2 may be fixedly connected to the seat-cushion side arm 3.

Also, in the shown embodiment, base member 1 is configured to have circumferentially-equidistant spaced, fitting protrusions 1*e* (that is, a six-petaled embossed fitting portion) formed on its outer peripheral surface (i.e., on the second annular outer peripheral portion 1*f*) by stamping. Instead of forming the embossed fitting portion of base member 1 into a six-petaled shape by half-blanking, the embossed fitting portion may be formed into another shape, for example a polygonal shape, serrated shape, or the like.

The entire contents of Japanese Patent Application No. 2011-239135 (filed Oct. 31, 2011) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A seat reclining device comprising:
a cover adapted to be fixedly connected to one of a seat-cushion side arm attached to a seat cushion and a seat-back side arm attached to a seat back, and having internal teeth;
a base member adapted to be fixedly connected to the other of the seat-cushion side arm and the seat-back side arm, and configured to be rotatable relatively to the cover;
an external gear configured to have fewer external teeth than a number of the internal teeth of the cover, one axial part of the external gear being press-fitted to an inner periphery of a recessed structure of the base member, and another axial part of the external gear partly meshing with the internal teeth;
a joining ring configured to join the base member and the cover together by retaining outer peripheries of the base member and the cover, while permitting relative rotation between the base member and the cover but restricting axial movement of both of the base member and the cover;
a pair of wedge-shaped members located in an annular eccentric space defined between an outer peripheral surface of a cylindrical portion of the cover and an inner peripheral surface of the external gear with the external teeth of the external gear brought into meshed-engagement with the internal teeth, wider basal ends of the pair of wedge-shaped members being arranged to be circumferentially opposed to each other;
a guide plate located in the eccentric space, and axially juxtaposed to the pair of wedge-shaped members, and kept in sliding contact with both the outer peripheral surface of the cylindrical portion of the cover and the inner peripheral surface of the external gear;
a ring-shaped spring configured to circumferentially bias the wider basal ends of the pair of wedge-shaped members apart from each other; and
a driving member configured to have a cylindrical-hollow portion rotatably fitted into the cylindrical portion of the cover, a flanged portion formed integral with the cylindrical-hollow portion, and a pushing lug formed integral with the flanged portion so as to axially protrude toward the eccentric space and configured to circumferentially push either one of narrower ends of the pair of wedged-shaped members,
wherein an inside-perimeter portion of the external gear is formed as a cylindrical protrusion configured to axially protrude toward the base member,
wherein the base member has a first annular axially-recessed portion whose inner periphery is configured as an internal-toothed portion so as to press-fit the one axial part of the external gear to the base member, a second annular axially-recessed portion formed on an inside perimeter of the first annular axially-recessed portion and configured to accommodate therein the cylindrical protrusion of the external gear, and a third annular axially-recessed portion formed on an inside perimeter of the second annular axially-recessed portion and configured to accommodate therein the spring,
wherein the base member has an annular outer peripheral portion formed on a backface of the second annular axially-recessed portion and an annular outer peripheral portion formed on a backface of the third annular axially-recessed portion, and the other of the seat-cushion side arm and the seat-back side arm has at least one fitting recessed portion, and either one of the annular outer peripheral portion of the backface of the second annular axially-recessed portion and the annular outer peripheral portion of the backface of the third annular axially-recessed portion is fitted to the at least one fitting recessed portion so as to be integrally connected thereto,
wherein the pair of wedge-shaped members, axially juxtaposed to the guide plate, are located in the eccentric space so as to face the cover, whereas the guide plate, axially juxtaposed to the pair of wedge-shaped members, is located in the eccentric space so as to face the base member; and
wherein the guide plate has an outer peripheral protrusion integrally formed with a circumference of the guide plate and configured to axially protrude toward the base member so as to accommodate the flanged portion of the driving member in a recessed internal space defined on an inside perimeter of the guide plate as a result of the outer peripheral protrusion being integrally formed with the circumference of the guide plate.

2. The seat reclining device as claimed in claim 1, wherein:

the annular outer peripheral portion of the backface of the second annular axially-recessed portion of the base member is formed with a plurality of fitting protrusions configured to protrude radially outward from a circumference of the annular outer peripheral portion of the backface of the second annular axially-recessed portion;

the other of the seat-cushion side arm and the seat-back side arm has a plurality of fitting recessed portions; and the plurality of fitting protrusions of the annular outer peripheral portion of the backface of the second annular axially-recessed portion are fitted to the respective fitting recessed portions and then welded together so as to integrally connect the base member and the other of the seat-cushion side arm and the seat-back side arm.

* * * * *